Figure 2:
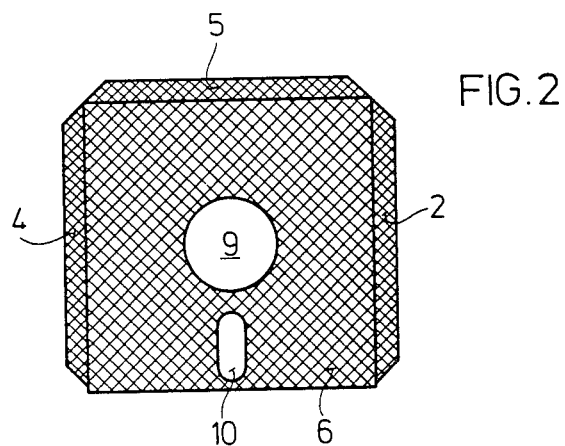

United States Patent [19]

Fehrenbach et al.

[11] Patent Number: 4,755,901

[45] Date of Patent: Jul. 5, 1988

[54] PROTECTIVE JACKET FOR A DISK-SHAPED RECORDING MEDIUM

[75] Inventors: Hubert Fehrenbach, Kehl; Werner Fehrenbach, Seelbach; Dietrich Gruehn, Appenweier; Kurt Zwintzscher, Willstaett, all of Fed. Rep. of Germany

[73] Assignee: BASF Aktiengesellschaft, Ludwigshafen, Fed. Rep. of Germany

[21] Appl. No.: 820,233

[22] Filed: Jan. 21, 1986

[30] Foreign Application Priority Data

Jan. 23, 1985 [DE] Fed. Rep. of Germany ... 8501635[U]
Jun. 1, 1985 [DE] Fed. Rep. of Germany ....... 3519691

[51] Int. Cl.$^4$ ..................... G11B 23/033; B65D 85/30
[52] U.S. Cl. .................................... 360/133; 206/313; 206/444; 369/72; 369/291; 361/220
[58] Field of Search .................. 360/97, 99, 133, 135; 361/212, 220; 369/72, 73, 291; 206/312, 313, 444, 328

[56] References Cited

U.S. PATENT DOCUMENTS 4,038,693  7/1977  Huffine et al. .................. 360/99
4,528,222  7/1985  Rzepecki et al. ............ 206/328 X

FOREIGN PATENT DOCUMENTS 0144783  6/1985  European Pat. Off. ........... 206/312

Primary Examiner—Stuart N. Hecker
Assistant Examiner—Benjamin E. Urcia
Attorney, Agent, or Firm—Keil & Weinkauf

[57] ABSTRACT

A protective jacket for recording media, in particular flexible recording media, is provided with a network or grid of conductor paths (6) to counteract electric charges, Advantageously, the jacket blank (1) is coated uniformly, in particular on both sides, with linear conductor paths (6). The protective jacket can be used for storing any recording media outside a recording/playback apparatus, or for operating any recording media inside such an apparatus. It is advantageous if, in the areas in which the blank (1) is welded to form a partially or completely closed jacket after folding, a conductor path grid or network is provided so that areas which are free of the conductive layer and are of prescribed dimensions are available between the conductor paths, such areas being necessary for welding.

16 Claims, 3 Drawing Sheets

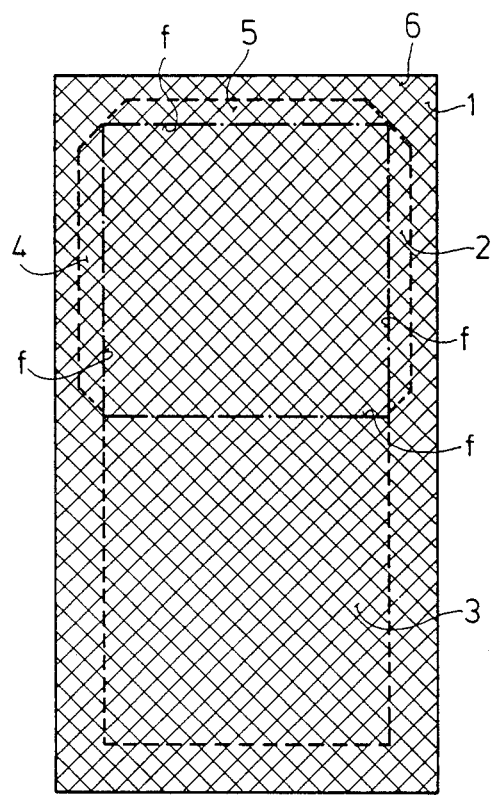
FIG.1
FIG.1A
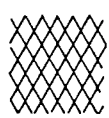  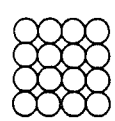 

PROTECTIVE JACKET FOR A DISK-SHAPED RECORDING MEDIUM

The present invention relates to a protective jacket for a disk-shaped recording medium, in particular for a flexible data recording medium, consisting of a blank of plastics material which is folded and joined together at at least three edges by welding, to produce a jacket which is open along at most one edge, the blank being provided with an electrically conductive coating on at least one side.

Such protective jackets for audio, video and data recording disks, films, X-ray plates, etc. are generally in the form of flat envelope-like jackets. Regardless of the recording material which is being used in the particular recording medium, and which may be suitable for storing signals magnetically, optically, etc., it is desirable to keep the recording medium free from dirt, dust, etc., in order that it affects playback of the recorded signals as little as possible. The danger of dust, etc. entering the jacket is greater when the recording medium is removable from the jacket than when the recording medium, in the case of a flexible magnetic medium, is completely enclosed by the jacket except for a few openings, and remains enclosed during recording/playback operations, as in the case of, for example, the FlexyDisk ® (® trademark of BASF Aktiengesellschaft) or other floppy disks.

FlexyDisk jackets are currently produced in general in the form of a blank from thin rigid PVC film. The blank is provided, prior to folding, with a nonwoven fabric on the surface which is subsequently to become the inside of the jacket, and is punched, folded to form a jacket, and welded at the side tabs which project when folding has been carried out The disk-shaped substrate film coated with magnetic dispersion is inserted into the jacket, which is still open at one edge, after which the end tab is folded and welded, and the magnetic medium is thus protected on all sides. This magnetic medium remains inside the jacket when used in a drive, e.g. a FlexyDisk drive, for recording/playback of signals.

During use, friction occurs between the surfaces of the magnetic medium and the inner surfaces of the jacket which are coated with the nonwoven. In unfavorable cases, in particular at relatively low atmospheric humidity, electrical charges form on the surface of the rigid PVC and may discharge via the magnetic medium containing densely recorded information, leading to signal errors, ie. dropouts, at the discharge point and therefore to the loss of data and the failure of the system.

To solve this problem, an attempt was made to impart conductivity to the jacket material by adding carbon black to it. This attempt was unsuccessful because of production difficulties. Furthermore, addition of carbon black resulted in a deterioration in other material properties, such as flexibility and weldability, which were previously good.

German Laid-Open Application DOS No. 2,634,501 discloses that the protective jacket can be lined on the inside with an electrically conductive layer of material provided between the nonwoven and the inner surface of the jacket. When such a conductive layer consists of a carbon black/binder paste, the carbon black has an adverse effect on the thermal weldability of the rigid PVC films, which is otherwise good. The tabs were therefore not coated, in order to avoid endangering the thermal weldability.

Another disadvantage arose when a solvent-containing paste was used, partial dissolution of the PVC surfaces taking place and inevitably resulting in a bending of the PVC film, thus making the jacket uneven. However, a solvent is required in order to ensure adequate adhesion of a conductive material.

It is an object of the present invention to provide a protective jacket with an antistatic surface by means of simple and effective measures, and preferably without the known disadvantages of lack of thermal weld-ability and curvature of the PVC material associated with known jackets.

We have found that this object is achieved, in accordance with the invention, if the conductive coating consists, at least in the areas provided for welding, of conductor paths which make contact with one another and/or intersect one another and are a distance apart.

This advantageously ensures that charge equilibration takes place on one or more jacket surfaces, and avoids the buildup of charges on uncoated parts of the jacket when a conductive coating has been provided at excessively large intervals. Furthermore, thermal welding in the weld areas is also possible.

It is very advantageous in practice if the entire blank is provided with a conductive coating on one or both sides, preferably on both sides, ie. the front and the back. The latter embodiment achieves charge equilibration between the front and the back of the jacket. In this embodiment, surfaces without a conductive coating are deliberately avoided so that the buildup of undesirable charges is counteracted.

Advantageously, the distance between the conductor paths is not more than 4 mm in order to ensure trouble-free thermal welding. Furthermore, the distance between the conductor paths should be not less than 0.8 mm. This ensures that between the individual conductor paths there are only small area, on which, on the one hand, no significant charges can collect, but which, on the other hand, do not adversely affect the welding process.

It is advantageous to apply the conductive coating by a printing process. The conductor paths should advantageously be from 0.3 to 1.0 mm, preferably from 0.5 to 0.8 mm, wide, in order to ensure reliable printing in any suitable printing process and the necessary wetting and adhesive power of a conventional printing paste when the conductive paths are applied by means of a printing process.

Suitable printing processes are any conventional methods, such as gravure printing, letterpress printing and screen printing. The great advantage of applying the conductor paths by a printing process is that one or both sides of the PVC film material are completely coated with conductor paths and the entire available printing area of the machine can therefore be utilized, both in screen printing and in rotary printing. Another advantage is that printing can be carried out independently of the subsequent application and arrangement of the nonwoven, without omitting any areas.

It is also advantageous and economical to use a conductive coating in the form of linear conductor paths and not to wet the entire surface of the jacket material with the paste and in particular with the solvent, so that the consumption of solvent is substantially smaller and furthermore a contribution toward reducing environmental pollution is made.

In an embodiment which is preferred in practice, the entire blank is provided with conductor paths on both, front and back, surfaces and produced with connecting tabs which are likewise provided with conductor paths on the front and back surfaces. By providing both surfaces of the tabs with a conductive coating, a charge-equilibrating connection between the front and back of the jacket is achieved in a simple manner.

In another embodiment, the conductive paths can be in the form of a conductive network or grid in which the said paths meet at an angle at their points of contact or have arc-like points of contact, or points of intersection, so that the structure which is suitable in each particular case can be obtained.

Conveniently the conductor paths can be formed from a printable past of a mixture of materials which consists in particular of conductive particles (eg. carbon black or graphite) and dilute binder. This provides an economical mixture of materials which is simple to prepare and easy to apply in a printing process. It is also possible to form the conductive paths from metal, for example to apply the said paths by metallization of the blank. For aesthetic reasons, the conductor paths on the outside of the jacket may contain colored pigments or colored particles.

The ohmic resistance of the conductor paths should be less than $10^8 \Omega$, preferably less than $10^6 \Omega$. This ensures adequate protection against electrostatic charging, in particular in the case of FlexyDisks or other floppy disks.

By using the novel conductor paths with their contact and/or intersection structure, the effective area of friction between the recording medium and the plastics material of the jacket is reduced so that the amount of static electricity due to friction is reduced from the outset.

Since the jacket material generally consists of rigid PVC film which typically has a surface resistance of from about $10^{12}$ to $10^{14}$ ohm at about 50% atmospheric humidity, a conductor path resistance of less than $10^8$ ohm is sufficient. In the case of other film materials, the upper limit for the resistance may be lower. When the resistance of the conductor paths is chosen to be in the region of a few 100 kiloohms or lower, charge equilbration is of course relatively faster.

In the context of the novel conductor paths, the property of conductivity comprises conduction of electrons and defect electrons, in particular in a very short period of time. Hence, all substances and metals known to be conductors or semiconductors can be used for the conductor paths. Insulating materials or substances which are only temporarily conductive are technically unsuitable for producing the conductor paths for charge equilibration.

The buildup of charge between the recording medium and the jacket is produced by static or frictional electricity or by the relative movement resulting in an electric effect and/or separation of existing charges. The charges may be present on the surface of in the material near the surface.

Another factor is important is this respect: the charge affinity, which determines on which surface of which body and at which point in time a larger or smaller amount of electric charge is present. Apart from the particular relative dielectric constants, the instantaneous nature of the surfaces involved also play an important role in this respect. The fact that different degrees of difficulty are involved in removing the particular electric charges, for example from the magnetic layer side of the recording medium and from the jacket film, constitutes a further factor. Such electric charges are substantially more difficult to remove from the film, due to its much higher surface resistance.

In another advantageous embodiment of the jacket, the conductor path grid can consist of a coarse grid of thick lines which is overlapped or superimposed by a fine grid of thin lines.

In another embodiment, the conductor path grid may be located in strips arranged parallel to the longitudinal axis of the blank.

Figure 3:
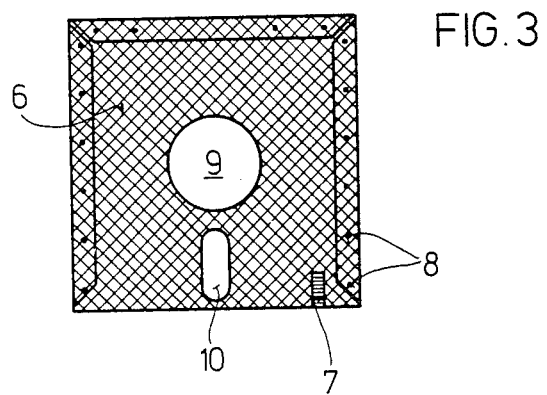
Figure 4:
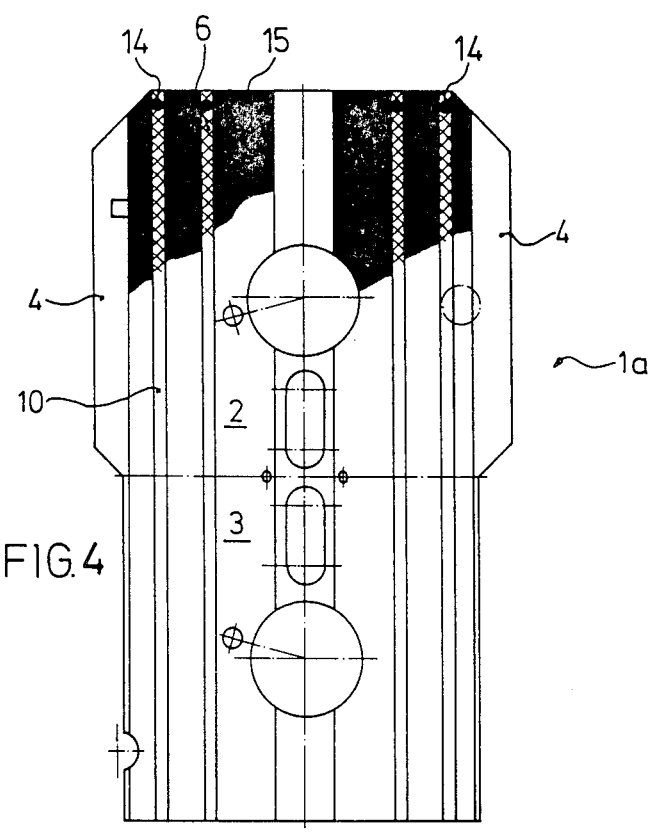
Figure 5:
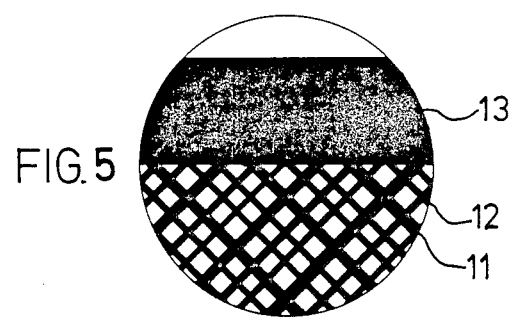

Embodiments of the invention will now be described, by way of example, with reference to the accompanying drawings, in which:

FIG. 1 shows an initial blank of one embodiment of a jacket according to the invention provided with conductor paths, FIG. 1A shows different forms of the points of contact or points of intersection for the conductor paths, FIG. 2 shows a jacket, according to the invention, prior to folding, FIG. 3 shows the jacket shown in FIG. 2 in a finished state, FIG. 4 shows a finished blank of another embodiment of jacket according to the invention possessing a uniform conductive coating combined with conductor paths in the form of grid strips, and FIG. 5 shows a section of the conductor path grid of the blank shown in FIG. 4 on a magnified scale.

In FIG. 1, reference numeral 1 denotes a rectangular initial blank of PVC film for producing a jacket of a FlexyDisk. The area 3 in which a nonwoven coating is to be applied is outlined therein by means of a dashed line. Reference numerals 2, 4 and 5 denote tab areas in which formerly subsequent thermowelding made it impossible for a uniform conductive coating to be present. The intended fold lines f are shown by means of dot-dash lines.

The conductor paths, in this case an orthogonal network or grid 6, are applied over the entire area of the initial blank, preferably by the gravure printing method. The printing medium consists of a conductive coating material or semiconductor coating material which is abrasion-resistant when dry and contains, for example, carbon black or graphite or other conductive particles in a suitable dilute binder dispersion. In terms of area, only about a fifth of the area is coated under the nonwoven area 3, and thus, when compared with a uniform conductive coating, about one fifth of the coating material is consumed. It is of course also possible, for example in order to achieve a resistance of from $10^5$ to $10^6 \Omega$, to use commercial chromium dioxide magnetic dispersions as printing pastes. Suitable metal coatings, likewise applied, for example, by a printing process, may of course also be used. For aesthetic or other reasons, the conductor paths on the outside of the jacket may contain colored pigments or colored particles.

The network or grid of the conductor paths advantageously comprises orthogonal intersections of linear paths whose widths are advantageously from about 0.5 to about 0.8 mm, although any other angles of intersection are also possible, as illustrated in, for example, FIG. 1A with the rhombic and triangular shapes. Apart from intersections, points of contact, as shown by the circular or sinewave-like lines in FIG. 1A, are also possible, as are other arcuate or curved shapes.

The distance between the conductor paths should be chosen sufficiently narrow to give areas between the individual conductor paths which on the one hand are small enough so that no substantial electrical charges can be maintained on them, but on the other hand, are large enough so that the joint welding subsequently required can still be carried out. If both sides of the blank 1 are coated in this way, it is possible to effect charge equilibration between the inner and outer surfaces of the jacket; moreover, any residual positive or negative electric charge present can then be conducted to earth by means of electrically conductive contact members provided on the apparatus (cf. FIG. 3).

For the conventional form of welding electrodes employed in jacket manufacture, it has been found experimentally that the distance between the conductor paths should not exceed about 4 mm in order to permit the electric charges to be conducted away reliably, and, in order to facilitate welding, should not be less than 0.8 mm.

The conductor paths can form a square, rhombic, triangular or circular arrangement or can be in the form of intertwined curves or completely randomly arranged (cf. FIG. 1A). To achieve optimum results the maximum and minimum distances should be roughly maintained. Thus a very large number of intersection or contact points are formed, and sufficiently large uncoated spaces are present between the conductor paths. Each conductor path should typically have a width of from 0.3 to 1.0 mm, preferably from about 0.5 mm to 0.8 m. The lower limit is determined by the reliability of printing, ie. by the printing process used and the wetting and adhesive power of the conductive printing paste employed.

A suitable printing process for sheet-like film formats a screen printing, while rotary printing by the gravure or letterpress printing method is employed for roll material. The plastic film may also be provided with a network-like coating by metallization.

The decisive advantages of this line printing method are that printing can be carried out economically, using large formats and completely utilizing the available printing area of the press, for example 6-fold printing, in the case of lithographic printing, or using wide rollers in the case of rotary printing, and the print can be applied uniformly, independently of the position of the nonwoven, which need only be determined at a later stage, and without omitting areas. Trimming to the desired small formats is carried out only when the printing is complete.

Because of the low consumption and the advantageously large area of coating in contact with air, the drying rate, and hence the capacity of the printing press, increases. Where a solvent-containing paste is used, a smaller amount of solvent will have to be expelled, so that correspondingly less environmental pollution will have to be accepted or it will be possible to reduce the cost of recovering the solvent.

The disadvantage described above, ie. curvature of the PVC film of the jacket when solvent-containing pastes are used, is also avoided by means of the invention because the low consumption of coating material and the linelike arrangement of the conductor paths on both sides of the PVC blank 1 prevents contraction, and hence curvature, of the surface.

The network-like coating on both sides of the PVC film blank results in an improvement of the entire product. The charge equilibration between the inside and outside of the blank is achieved by virtue of the fact that, when folding is effected, the inside, which is coated with conductor paths, makes very intimate contact with the coated outside at several intersection points and/or contact points, via the three folding tabs 2, 4 and 5 in FIG. 1. FIG. 2 shows an intermediate step during folding of the jacket, ie. folding of the central part. The latter, like the entire outer surface, is coated with conductor paths, and the side tabs 2 and 4 and the end tab 5 are coated in the same way as the entire inner area, and these parts come into direct contact with one another when the side and end tabs are folded over, as shown in FIG. 3. For the sake of clarity, the inside is shown with a finer-meshed coating. However, the distance between the conductor paths is advantageously the same as that on the remaining area. The residual charge can be conducted away on insertion into the drive, via a conductive, abrasion-resistant metal foil 7 mounted on the outside, for example in the region of the central fold, and via an earth contact mounted at an appropriate point in the drive.

The weld points are denoted by 8, and are predominantly located between conductive paths of the network 6. The drive aperture 9, by means of which the recording medium (not shown here) can be operated by the drive, is located in the center of the jacket, and reference numeral 10 denotes the head opening.

A possible practical embodiment comprises a printing paste which consists of, for example, one part of carbon black dispersed in about 10 parts of dilute binder so that the paste has a viscosity of from about 300 to about 1000 mPa (millipascal). When applied in a thickness of from 1.5 to 2 $\mu$m, a surface resistance of not more than 1 M$\Omega$ is achieved. Corresponding conductor paths grids according to the invention, in conjunction with relatively rigid PVC film jackets, did not exhibit any measurable buildup of static charge on the jacket.

The jacket blanks, in which functional openings are introduced simultaneously with punching out of the contour of the blanks, are provided, on the intended inner surface of the jacket, with a nonwoven liner which serves for cleaning the disk rotating in the jacket during the write/read operation.

The blank 1a (FIG. 4) is then folded mechanically and processed to a closed jacket by welding the overlapped halves 2 and 3 of the blank by means of encompassing tabs 4.

As stated above, the weld points 14 must be free of the conductive coating (strip 13). This is achieved without additional expense in a mechanized manufacturing sequence if, at these points, the coating 13, for example a uniform coating, becomes a grid 6 comprising intersecting conductor paths. In an advantageous embodiment (FIG. 5), a fine grid 12 consisting of fairly thin conductor paths is superimposed on a coarse grid 11 consisting of thicker conductor paths. On the one hand, there is still a sufficient amount of free areas between the intersecting conductor paths for the weld points, and on the other hand the thicker conductor paths of the coarse grid reliably conduct electrostatic charges to the conductive layer 13, which is uniform in this case, the fine grid resulting in the conductivity in the region of the weld points being similar to that of the uniform conductive coating. The fine grid divides the film surfaces into very small area elements which can absorb only very small charges. The electrical charges are conducted to the coarse lines via the fine ones. Hence, extremely thin lines are adequate for the fine grid.

The width of the conductor paths can be from 0.1 to 1.0 mm. In practice, a thickness of 0.2 mm for the paths of the fine grid has proven useful, when a path thickness of from 0.3 mm to not more than 0.5 mm can be chosen for the paths of the coarse grid. However, greater line thickness can also advantageously be employed. The distances between the paths can be from 0.8 to 1.2 mm, advantageously about 1.0 mm; however, distances of up to about 4 mm can also be used.

The conductive layer 6, including the path grids 11 and 12, is advantageously applied onto the film web by means of the above printing processes, preferably the gravure printing process. It has proven advantageous to provide strips 15 which run parallel to the longitudinal axis of the blanks 1 and in which the conductor path grids are arranged.

In the procedure for the production of such jackets, in which jacket blanks are punched out from a web of film material, those surfaces of the said blanks which are intended for the inner surface of the jacket being covered with a nonwoven material, the individual blanks together with the nonwoven material are then folded to form the jacket, and the sections of the blank which come into contact are joined together at the intended connecting parts by welding, the electrically conductive layer is applied onto the web by means of the conventional printing process, in particular a gravure printing process, in the case of the novel jacket.

We claim:

1. A protective jacket for a disk-shaped recording medium, in particular a flexible data recording medium, comprising a blank of plastics material which blank has inner and outer surfaces parts of which are folded and joined together at along least three edges by welding to produce a jacket not welded along at most one edge, both the inner and the outer surface of the blank being provided with an electrically conductive coating which comprises a plurality of conductor paths in electrical contact with one another, said conductor paths being spaced apart by a distance of not more than 4 mm at least in the areas in which the plastics material is to be joined together by welding so that upon folding of said blank to form the jacket the conductively coated inside and outside surface of the blank are made to overlap in electrically contacting relation to each other.

2. A protective jacket as claimed in claim 1, wherein the entire electrically conductive coating of both of said surfaces of the blank consists of a plurality of spaced apart conductor paths.

3. A protective jacket as claimed in claim 1, wherein both said surfaces of the blank are provided with a plurality of conductor paths which intersect each other.

4. A protective jacket as claimed in claim 1, wherein the distance between the conductor paths is sufficiently large to permit a thermal welding method to be used for joining the parts of the blank.

5. A protective jacket as claimed in 1, wherein the distance between adjacent conductor paths is not less than 0.8 mm.

6. A protective jacket as claimed in claim 1, wherein the width of the conductor paths is from 0.1 to 0.8 mm.

7. A protective jacket as claimed in claim 1, wherein the conductive paths are arranged in two sets at right angles to each other and form a conductor path grid.

8. A protective jacket as claimed in claim 7, wherein the conductor path grid comprises a coarse grid of thick conductor paths and a fine grid of thin conductor paths, the coarse and fine grids being superimposed on each other.

9. A protective jacket as claimed in claim 1, wherein the conductor path grid as a whole does not cover the entire surface of the blank but is arranged in the form of strips running perpendicular to the line along which the blank is folded.

10. A protective jacket as claimed in claim 1, wherein the conductive coating is in the form of a layer or layers applied by means of a printing process.

11. A protective jacket as claimed in claim 1, wherein the entire blank is provided with conductor paths on both surfaces and is provided with connecting tabs which are also provided with conductor paths on the front and back.

12. A protective jacket as claimed in claim 1, wherein the conductor paths are in the form of a network in which said paths touch or intersect each other.

13. A protective jacket as claimed in claim 1, wherein the conductor paths comprise a paste of a dispersion comprising carbon black and dilute binder.

14. A protective jacket as claimed in claim 13, wherein the paste contains coloured particles.

15. A protective jacket as claimed in claim 1, wherein the conductor paths consist of metal.

16. A protective jacket as claimed in claim 1, wherein the ohmic resistance of the conductor paths is less than or equal to one megohm.

* * * * *

UNITED STATES PATENT AND TRADEMARK OFFICE
CERTIFICATE OF CORRECTION

PATENT NO. : 4,755,901

DATED : Jul. 5, 1988

INVENTOR(S) : Fehrenbach et al.

It is certified that error appears in the above-identified patent and that said Letters Patent is hereby corrected as shown below:

Col. 7, line 35 "at along" should be -- along at --

Signed and Sealed this

Twentieth Day of December, 1988

*Attest:*

DONALD J. QUIGG

*Attesting Officer*      *Commissioner of Patents and Trademarks*